(12) United States Patent
Konik et al.

(10) Patent No.: US 9,286,393 B2
(45) Date of Patent: **\*Mar. 15, 2016**

(54) PERFORMING A FUNCTION ON ROWS OF DATA DETERMINED FROM TRANSITIVE RELATIONSHIPS BETWEEN COLUMNS

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Rochester, MN (US); Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 227 days.

This patent is subject to a terminal disclaimer.

(21) Appl. No.: 13/794,737

(22) Filed: Mar. 11, 2013

(65) Prior Publication Data

US 2014/0172908 A1 Jun. 19, 2014

Related U.S. Application Data

(63) Continuation of application No. 13/718,097, filed on Dec. 18, 2012.

(51) Int. Cl.
*G06F 17/30* (2006.01)

(52) U.S. Cl.
CPC .... *G06F 17/30864* (2013.01); *G06F 17/30286* (2013.01); *G06F 17/30477* (2013.01)

(58) Field of Classification Search
CPC ............... G06F 17/245; G06F 17/246; G06F 17/30289; G06F 17/30011; G06F 17/30864; G06F 17/30; G06F 17/30292; G06F 17/30315; G06F 17/30424; G06F 17/24; G06F 17/30489; G06F 17/30498; G06F 17/30539; G06F 17/30587
USPC .................................................. 707/769, 803
See application file for complete search history.

(56) References Cited

U.S. PATENT DOCUMENTS

| | | | |
|---|---|---|---|
| 5,963,959 A | * | 10/1999 | Sun et al. |
| 7,653,665 B1 | * | 1/2010 | Stefani et al. .................... 714/19 |
| 2004/0101142 A1 | * | 5/2004 | Nasypny ....................... 380/278 |
| 2005/0038783 A1 | | 2/2005 | Lei et al. |
| 2006/0265394 A1 | | 11/2006 | Raman et al. |
| 2007/0283020 A1 | * | 12/2007 | Chowdary et al. ............ 709/227 |
| 2009/0292711 A1 | * | 11/2009 | Konik et al. .................. 707/100 |
| 2010/0005512 A1 | * | 1/2010 | Wahl ............................... 726/4 |
| 2011/0161310 A1 | | 6/2011 | Tang et al. |

\* cited by examiner

*Primary Examiner* — Pierre Vital
*Assistant Examiner* — Andalib Lodhi
(74) *Attorney, Agent, or Firm* — Owen J. Gamon; Roy W. Truelson

(57) ABSTRACT

In an embodiment, a request is received that specifies a function and a specified key value. Rows from all tables that are accessible from the specified key value are transitively searched, wherein the transitively searching further comprises finding values in a plurality of pairs of columns, wherein found rows that are found by the transitively searching comprise values in a respective first column of the plurality of pairs of columns that satisfy a dependency relationship with values in a respective second column of the plurality of pairs of columns. The function is executed against only the found rows.

15 Claims, 10 Drawing Sheets

PERFORMING A FUNCTION ON ROWS OF DATA DETERMINED FROM TRANSITIVE RELATIONSHIPS BETWEEN COLUMNS

CROSS-REFERENCE TO RELATED APPLICATIONS

This application is a continuation of U.S. patent application Ser. No. 13/718,097, filed Dec. 18, 2012, entitled "PERFORMING A FUNCTION ON ROWS OF DATA DETERMINED FROM TRANSITIVE RELATIONSHIPS BETWEEN COLUMNS," and incorporated by reference herein in its entirety.

FIELD

This invention generally relates to computer database management systems and more specifically relates to determining transitive relationships between columns of data in the database.

BACKGROUND

Computer systems typically comprise a combination of computer programs and hardware, such as semiconductors, transistors, chips, circuit boards, storage devices, and processors. The computer programs are stored in the storage devices and are executed by the processors. Fundamentally, computer systems are used for the storage, manipulation, and analysis of data.

One mechanism for managing data is called a database management system (DBMS) or simply a database. Many different types of databases are known, but the most common is usually called a relational database, which organizes data in tables that have rows, which represent individual entries, tuples, or records in the database, and columns, keys, fields, or attributes, which define what is stored in each row, entry, tuple, or record. Each table has a unique name or identifier within the database and each column has a unique name within the particular table. The database also has one or more indexes, which are data structures that inform the DBMS of the location of a certain row in a table given an indexed column value, analogous to a book index informing the reader of the page on which a given word appears.

The most common way to retrieve data from a database is through statements called database queries, which may originate from user interfaces, application programs, or remote computer systems, such as clients or peers. A query is an expression evaluated by the DBMS, in order to retrieve data from the database that satisfies or meets the criteria or conditions specified in the query. Although the query requires the return of a particular data set in response, the method of query execution is typically not specified by the query. Thus, after the DBMS receives a query, the DBMS interprets the query and determines what internal steps are necessary to satisfy the query. These internal steps may comprise an identification of the table or tables specified in the query, the row or rows selected in the query, and other information such as whether to use an existing index, whether to build a temporary index, whether to use a temporary file to execute a sort, and/or the order in which the tables are to be joined together to satisfy the query. When taken together, these internal steps are referred to as a query plan (QP), a query execution plan (QEP), a query access plan (QAP), or an access plan (AP). The DBMS often saves the query plan and reuses it when the user or requesting program repeats the query, which is a common occurrence, instead of undergoing the time-consuming process of recreating the query plan.

SUMMARY

A computer-readable storage medium and computer system are provided. In an embodiment, a request is received that specifies a function and a specified key value. Rows from all tables that are accessible from the specified key value are transitively searched, wherein the transitively searching further comprises finding values in a plurality of pairs of columns, wherein found rows that are found by the transitively searching comprise values in a respective first column of the plurality of pairs of columns that satisfy a dependency relationship with values in a respective second column of the plurality of pairs of columns. The function is executed against only the found rows.

It is to be noted, however, that the appended drawings illustrate only example embodiments of the invention, and are therefore not considered a limitation of the scope of other embodiments of the invention.

DETAILED DESCRIPTION

Figure 1:
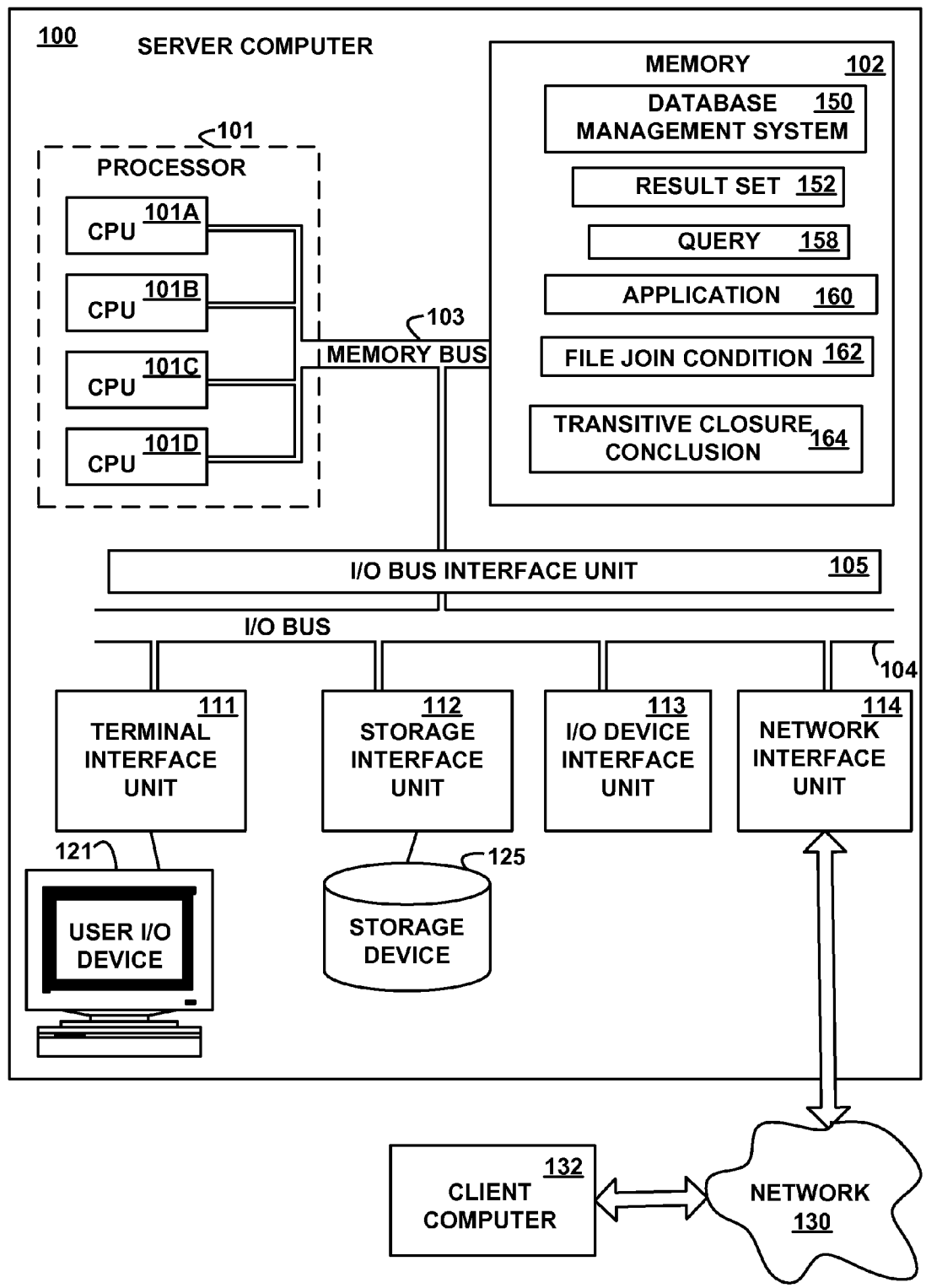
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the server computer system 100 comprise one or more processors 101, a memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/O bus 104, and an I/O bus interface unit 105.

The server computer system 100 contains one or more general-purpose programmable central processing units (CPUs) 101A, 101B, 101C, and 101D, herein generically referred to as the processor 101. In an embodiment, the server computer system 100 contains multiple processors typical of a relatively large system; however, in another embodiment the server computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium (either volatile or non-volatile) for storing or encoding data and programs. In another embodiment, the memory 102 represents the entire virtual memory of the server computer system 100, and may also include the virtual memory of other computer systems coupled to the server computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 stores or encodes a database management system (DBMS) 150, a result set 152, a query 158, an application 160, a file join condition 162, and a transitive closure conclusion 164. Although the database management system 150, the result set 152, the query 158, the application 160, the file join condition 162, and the transitive closure conclusion 164 are illustrated as being contained within the memory 102 in the server computer system 100, in other embodiments some or all of them may be on different computer systems and may be accessed remotely, e.g., via the network 130. For example, the database management system 150, the result set 152, the query 158, the application 160, the file join condition 162, and the transitive closure conclusion 164 may be stored in memory in the client computer 132. The server computer system 100 may use virtual addressing mechanisms that allow the programs of the server computer system 100 to behave as if they only have access to a large, single storage entity instead of access to multiple, smaller storage entities. Thus, while the database management system 150, the result set 152, the query 158, the application 160, the file join condition 162, and the transitive closure conclusion 164 are illustrated as being contained within the memory 102, these elements are not necessarily all completely contained in the same storage device at the same time. Further, although the database management system 150, the result set 152, the query 158, the application 160, the file join condition 162, and the transitive closure conclusion 164 are illustrated as being separate entities, in other embodiments some of them, portions of some of them, or all of them may be packaged together.

In an embodiment, the DBMS 150 and/or the application 160 comprise instructions or statements that execute on the processor 101 or instructions or statements that are interpreted by instructions or statements that execute on the processor 101, to carry out the functions as further described below with reference to FIGS. 2, 3, 4, 5, 6, 7, 8, 9, and 10. In another embodiment, the DBMS 150 and/or the application 160 are implemented in hardware via semiconductor devices, chips, logical gates, circuits, circuit cards, and/or other physical hardware devices in lieu of, or in addition to, a processor-based system. In an embodiment, the DBMS 150 and/or the application 160 comprise data, in addition to instructions or statements.

The memory bus 103 provides a data communication path for transferring data among the processor 101, the memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the server computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface unit 113 provides an interface to any of various other input/output devices or devices of other types, such as printers or fax machines. The network interface unit 114 provides one or more communications paths from the server computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface unit 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 105 and the I/O bus 104 are shown as single respective units, the server computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the server computer system 100 is a multi-user mainframe computer system, a single-user system, or a server computer or similar device that has little or no direct user interface, but receives requests from other computer systems (clients). In other embodiments, the server computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the server computer system 100 and the computer system 132. In various embodiments, the network 130 may represent a storage device or a combination of storage devices, either connected directly or indirectly to the server computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The client computer system 132 may comprise some or all of the hardware and/or computer program elements of the server computer system 100. In an embodiment, the application 160 may be stored in a storage device at the client computer 132, may execute on a processor at the client computer 132, and may send the queries 158 to and receive the result sets 152 from the server computer system 100 via the network 130.

FIG. 1 is intended to depict the representative major components of the server computer system 100, the network 130, and the client computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the server computer system 100 and that, when read and executed by one or more processors in the server computer system 100 or when interpreted by instructions that are executed by one or more processors, cause the server computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
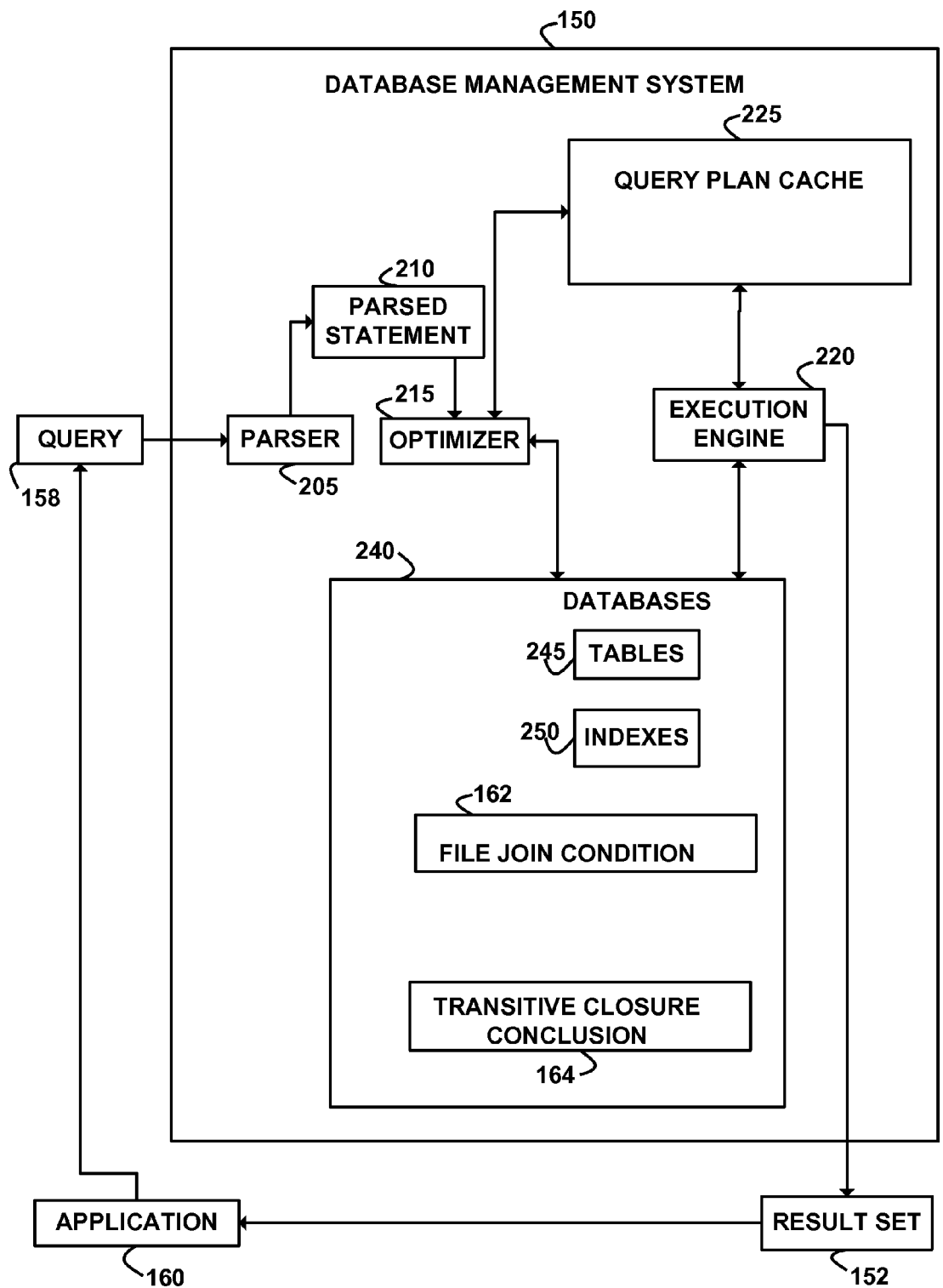
FIG. 2 depicts a block diagram of an example database management system, according to an embodiment of the invention.

FIG. 2 depicts a block diagram of an example database management system 150, according to an embodiment of the invention. The DBMS 150 comprises a parser 205, a parsed statement 210, an optimizer 215, an execution engine 220, a query plan cache 225, and databases 240.

The database 240 comprises tables 245, optional indexes 250, the file join condition 162, and the transitive closure conclusion 164. In other embodiments, the file join condition 162 and the transitive closure conclusion 164 may be stored outside of the databases 240, such as in the query plan cache 225, the application 160, or in memory assigned to or associated with the application 160, such as in the same package as the application 160. The tables 245 organize data in rows, which represent individual entries, tuples, or records and columns, keys, fields, or attributes, which define what is stored in each row, entry, tuple, or record. Each table 245 has a unique name or identifier within a database 240 (but not necessarily a unique name across all databases) and each column has a unique name within the particular table 245. The indexes 250 are data structures that inform the DBMS 150 of the location of a certain row in a table 245, in response to the indexes 250 receiving an indexed column value. In an embodiment, the databases 240 and/or the tables 245, the indexes 250, the file join condition 162 and the transitive closure conclusion 164 are organized into schemas, such as directories, subdirectories, or catalogs. A schema may comprise one or more of the databases 240, tables 245, indexes 250, file join conditions 162 and/or transitive closure conclusions 164.

The parser 205 in the DBMS 150 receives the query 158 from the application 160. The query 158 requests that the DBMS 150 search for or find a row or combination of rows of data from the tables 245 and store the data from those found rows into the result set 152 that meet or satisfy the criteria, keys, and or values specified by the query 158. The DBMS 150 may also receive other commands from the application 160, such as insert commands, update commands, commands to create a sparse database, and commands that request that a function be executed against a subset of rows of the database 240. In an embodiment, the application 160 sends the same query 158 multiple times to the DBMS 150, which may or may not result in a different result set 152, depending on whether the data in the DBMS 150 has changed between occurrences of the query 158 or whether different values are passed into the query 158 via parameter markers or host variables. In an embodiment, the application 160 sends different queries 158 to the DBMS 150. The parser 205 generates a parsed statement 210 from the query 158, which the parser 205 sends to the optimizer 215. The optimizer 215 performs query optimization on the parsed statement 210. As a part of query optimization, the optimizer 215 generates one or more query plans and stores them to the query plan cache 225, using data such as the statistics, resource availability, platform capabilities, query content information, etc., that is stored in the database 240.

In response to a query 158 that requests data from multiple tables, the optimizer 215 creates a query plan that specifies the joining of tuples from these multiple tables (the tuples are concatenated horizontally into the result set 152), in order to find and retrieve the data from all the tables. Thus, a join operation is a relationship between two tables accessed by execution of an execution plan that represents a query (a join query), and the DBMS 150 performs a join operation to connect (or join) data from two or more tables, wherein the DBMS 150 joins together tuples with matching attributes to form a new tuple. The join order is specified by the execution plan and is the order in which the DBMS 150 performs join operations when the DBMS 150 executes the query 158 via the execution plan to retrieve and join rows of data from the database tables into the result set 152. In an embodiment, the DBMS 150 implements join operations using a nested loop algorithm, where the DBMS 150 joins resultant new tuples from the first two tables in the join order to the resultant tuples from the third table and joins those results to the fourth table, etc. Eventually all of the needed join operations are complete, and the resultant new tuples are the result set 152 that satisfies the query 158.

Because a single join is limited to accessing two tables, the DBMS 150 performs multi-table joins in sequence according to a particular order. Many different join queries may be implemented by joining the tables, in any of several possible join orders. For example, a query that involves joining tables A, B, and C can often be performed as a join of table A and B followed by a join of table A and C. Alternatively, the same query may be performed as a join of table A and C followed by the join of table A and B. The optimizer 215 attempts to select a join order that eliminates the greatest number of records from the potential result set 152 early in the join processing, which saves the costs associated with repeatedly accessing tables later in the join operation.

The execution engine 220 reads the selected query plan from the query plan cache 225 and executes the selected query plan, optionally using the indexes 250, in order to find and retrieve the data from the tables 245 that satisfies the criteria of the query 158. The execution engine 220 stores the resultant data that satisfies the criteria specified by the query 158 into the result set 152, which the DBMS 150 returns to the application 160, as a response to the query 158.

Although FIG. 2 illustrates the query plan cache 225 as being contained within the DBMS 150, in another embodiment, the application 160 comprises the query plan cache 225. In various embodiments, each application 160 has its own query plan cache 225 within the respective application 160, each application 160 has its own query plan cache 225 outside the respective application 160, or the applications 160 share the same query plan cache 225. The query plan cache 225 may be scoped system wide, application wide, object wide, to a thread, or any other scoping criteria. In various embodiments, the application 160 is a user application, a third-party application, an operating system, or any portion, multiple, or combination thereof. In an embodiment, the query plan cache 225 may be in an SQL (Structured Query Language) package. In various embodiment, the query plan cache 225 may be stored on the same server computer system 100 as the DBMS 150, may execute in the same or a different virtual machine as the DBMS 150, or may be stored on a different computer from the DBMS 150 and accessed, e.g., via the network 130.

Figure 3:
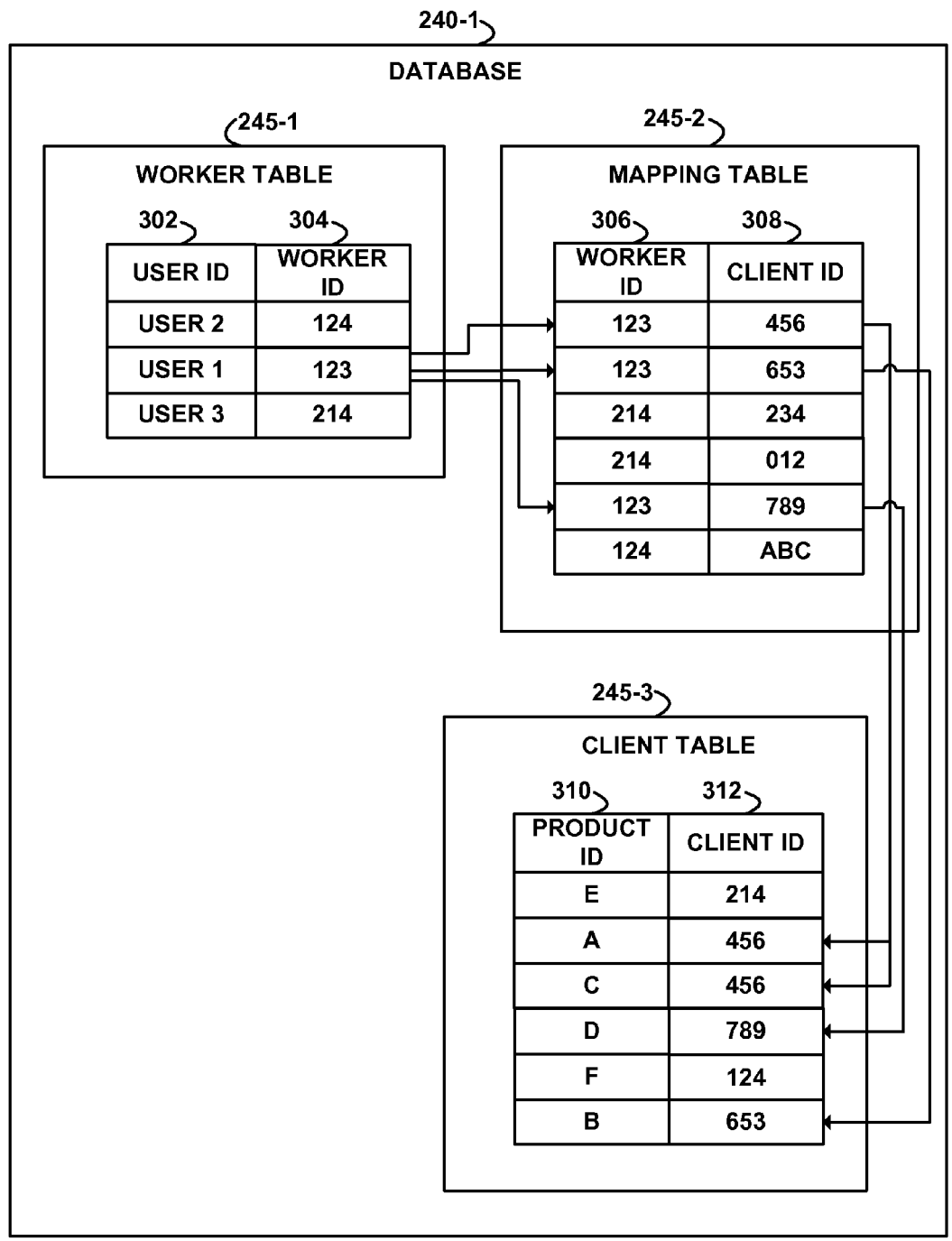
FIG. 3 depicts a block diagram of an example database, according to an embodiment of the invention.

FIG. 3 depicts a block diagram of an example database 240-1, according to an embodiment of the invention. The database 240-1 is an example of, and is generically referred to by, the database 240 (FIG. 2). The database 240-1 comprises example tables 245-1, 245-2, and 245-3. The example table 245-1 comprises any number of rows, each of which comprises an example user identifier (ID) column 302 and a worker identifier column 304. The example table 245-2 comprises any number of rows, each of which comprises an example worker identifier column 306 and a client identifier column 308. The example table 245-3 comprises any number of rows, each of which comprises an example product identifier column 310 and a client identifier column 312.

The database 240-1 has dependency relationships between the columns of the tables. In various embodiments, the dependency relationships may be specified by join predicates in the query 158 or by referential constraints specified in the database 240-1. A join predicate is portion of the query 158 that comprises a conditional criteria expression, which the DBMS 150 evaluates to either true or false by substituting data from the records that the DBMS 150 retrieves from the database table into variables in the expression that match column identifiers in the records.

In various embodiments, the join predicates specify any instance, multiple, and/or combination of: data; columns, fields, or keys; functions, calls, invocations, methods, classes, or applets; relational operators (e.g., greater than, less than, equal to, not equal to, greater than or equal to, less than or equal to, member of, or any other relational operator); logical operators (e.g., AND, OR, XOR, NOT, NOR, NAND, or any other logical operator); arithmetic operators (e.g., multiplication, division, addition, subtraction, bases, powers, logarithms, or any other arithmetic operators); and register operations (e.g., shift left, shift right operations, or any other register operation). Further, the relational operators, the logical operators, the arithmetic operators, and the register operations may have any number of arguments or operands (e.g., they may be unary, binary, ternary, or n-ary).

A referential constraint is a logical rule that the DBMS 150 enforces that constrains or restricts the data values that the DBMS 150 allows to be inserted into or updated into the rows and columns of the tables 245-1, 245-2, and/or 245-3, in order to preserve referential integrity between columns in a table or between columns in multiple tables. Consider the example of a set of tables that shares information regarding workers of a company, with the worker table 245-1 storing information that describes the workers and the mapping table 245-2 describing the assignment of workers to clients. Occasionally, a new worker joins the company or a worker leaves. The DBMS 150 defines a referential constraint, stating that each value in each of row of the worker identifier column 306 in the mapping table 245-2 must match a value in a row in the worker identifier column 304 of the worker table 245-1. The referential constraint prevents inserts or updates that would otherwise result in missing or inconsistent worker identifiers across multiple tables.

Stated more formally, referential integrity is the state of tables in which all values of all foreign keys are valid. A key is one or more columns in a table that the database uses to sort data. In an embodiment, a database table may have none, one, or more than one key, allowing the DBMS 150 to sort rows in different ways. A foreign key is a column or a set of columns in a table whose values are required (by referential integrity) to match at least one primary key value of a row in its parent table. A referential constraint requires that the values of the foreign key are valid only if one of the following conditions is true: the foreign key value appears as a value in a row of a parent key, or some component of the foreign key is null. The table containing the parent key is called the parent table of the referential constraint, and the table containing the foreign key is called a dependent table and is said to be a dependent of the parent table. A parent key is a primary key or a unique key of a referential constraint. A key is unique if each value in the rows of the column appears only once within the column, i.e., no duplicate values exist within that column. A parent row is a row in a parent table that has at least one dependent row in a dependent table. A parent table is a table that contains the parent key of a referential constraint. The columns of the foreign key and its parent key match; i.e., the names of the column of the foreign key in the dependent table and the parent key in the parent table are identical.

A table may be a parent in an arbitrary number of referential constraints. A table that is the parent in a referential constraint may also be the dependent table in another referential constraint. In various embodiments, referential constraints are defined via create table or alter table commands that the application 160 sends to the DBMS 150. The DBMS 150 enforces the referential constraints, as further described below, as part of the DBMS 150 processing of insert and update operations, which request additions to or changes of the data values in rows of the data tables.

In response to receiving an insert operation that requests inserting data into a data table that has an associated referential constraint, the DBMS 150 determines whether a non-null insert value of a foreign key (specified by the constraint) matches some value in a row of the corresponding parent key (the parent column in the parent table (specified by the constraint) that matches the dependent column in the dependent table that is specified by the command). If a non-null insert value of a foreign key matches some value of the corresponding parent key (the parent column in the parent table that matches the dependent column in the dependent table that is specified by the command), then the DBMS 150 inserts the data into a row of the data table because the constraint is met. If the non-null insert value of a foreign key does not match some value of the corresponding parent key, then the DBMS 150 performs the action specified by the constraint because the constraint is violated.

In response to receiving an update operation that requests the updating of data in a row in a column of the parent key in the parent table that has an associated referential constraint, the DBMS 150 determines whether any row in the dependent table matches the original value of the key or if any row in the dependent table does not have a corresponding parent key in a parent table (specified by the constraint) when the update statement would be completed. If any row in the dependent table matches the original value of the key or if any row in the dependent table does not have a corresponding parent key when the update statement would be completed, then the DBMS 150 performs the action specified by the constraint because the constraint is violated. If any row in the dependent table does not match the original value of the key and if every row in the dependent table would have a corresponding parent key when the update operation completes, then the DBMS 150 performs the update because the constraint is met.

In response to receiving an update operation to update data in a dependent row in a dependent table, if the update specifies a foreign key (that matches a foreign key specified by the constraint) and a non-null update value of the foreign key does not match some value of the parent key of the parent table (specified by the constraint) when the update statement would be completed, then the DBMS 150 performs the action specified by the constraint because the constraint is violated. If the update operation does not specify a foreign key or a non-null update value of the foreign key would match some value of the parent key of the parent table when the update operation completes, then the DBMS 150 performs the update because the constraint is met.

Thus, in the example of FIG. 3, in an embodiment, the DBMS 150 enforces a referential constraint between the worker table 245-1 and the mapping table 245-2 where the worker identifier 306 is the foreign key, dependent key, and child key, the worker identifier 304 is the primary key and parent key, the worker table 245-1 is the parent table, and the mapping table 245-2 is the child table and dependent table. The DBMS 150 further enforces a referential constraint between the mapping table 245-2 and the client table 245-3 where the client identifier 308 is the primary key and parent key, the client identifier 312 is the foreign key, dependent key, and child key, the client table 245-3 is the child table and dependent table, and the mapping table 245-2 is the parent table. In another embodiment, the DBMS 150 infers the dependency relationships between the worker table 245-1 and the mapping table 245-2 and between the mapping table 245-2 and the client table 245-3 from the join predicates of the received queries 158, as further described below.

Figure 4:
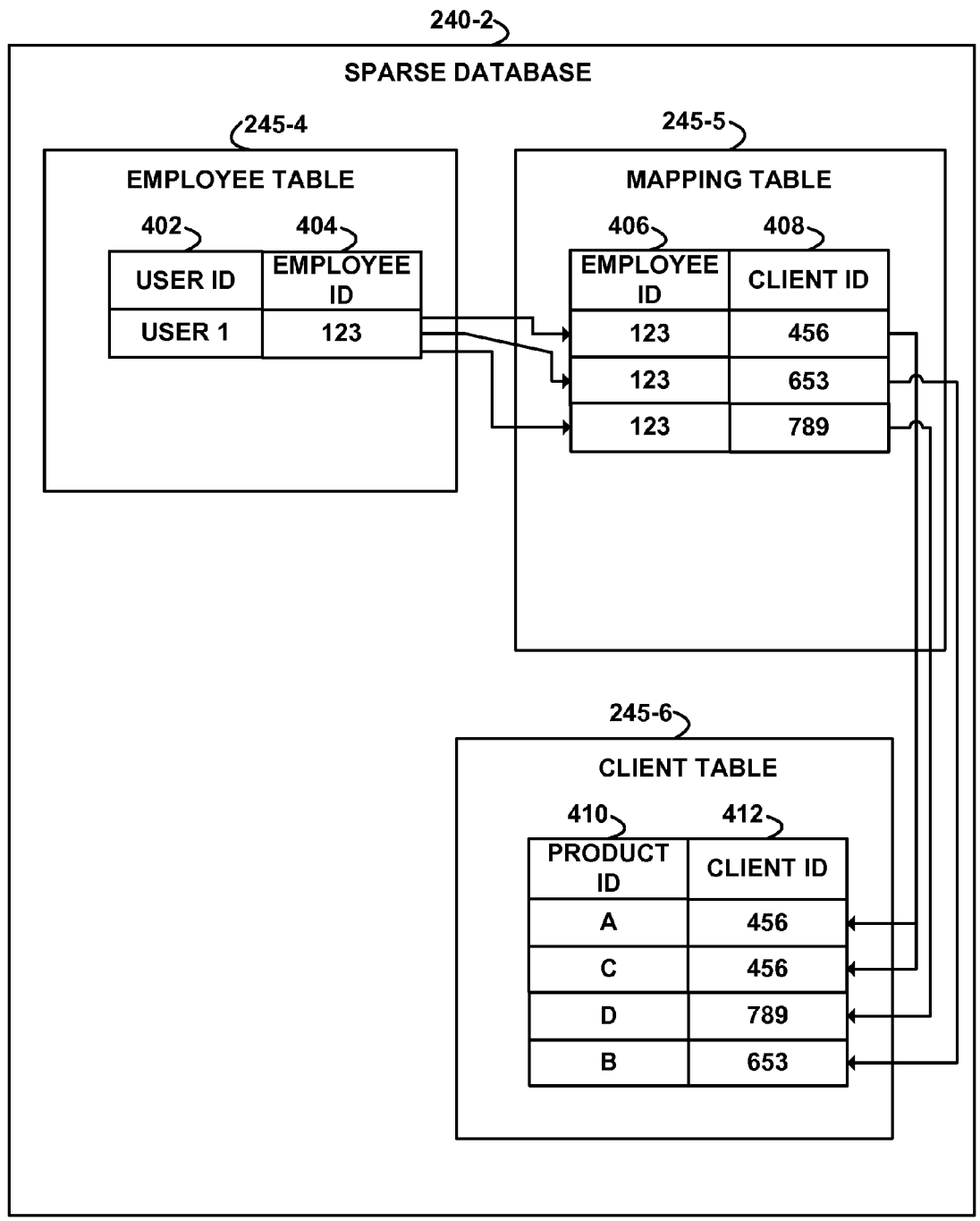
FIG. 4 depicts a block diagram of an example sparse database, according to an embodiment of the invention.

FIG. 4 depicts a block diagram of an example sparse database 240-2, according to an embodiment of the invention. The sparse database 240-2 is an example of, and is generically referred to by, the database 240 (FIG. 2). The sparse database 240-2 comprises example tables 245-4, 245-5, and 245-6. The example table 245-4 comprises any number of rows, each of which comprises an example user identifier column 402 and a worker identifier column 404. The example table 245-5 comprises any number of rows, each of which comprises an example worker identifier column 406 and a client identifier column 408. The example table 245-6 comprises any number of rows, each of which comprises an example product identifier column 410 and a client identifier column 412.

The DBMS 150 created the sparse database 240-2, so that the worker table 245-4 (FIG. 4) comprises a subset of the rows of the worker table 245-1 (FIG. 3), the mapping table 245-5 (FIG. 4) comprises a subset of the rows of the mapping table 245-2 (FIG. 3), and the client table 245-6 (FIG. 4) comprises a subset of the rows of the client table 245-3 (FIG. 3). The DBMS 150 created the sparse database 240-2 from the database 240-1 (FIG. 3) by transitively searching rows from all of the tables in the database 240-1 and finding foreign key values that match primary key values (where the column names of the foreign key and primary key have the same name) in pairs of tables, starting from a specified key value, which in this example is "user 1" in the user identifier column 302 of the worker table 245-1. (In another embodiment, the column names do not need to match.) Thus, in response to a command that requested the creation of a sparse database and specified the key value of "user 1" and the column 302 of the worker table 245-1, the DBMS 150 read the worker table 245-1 and discovered that the row that comprises "user 1" in the column 302 also comprised "123" in the worker identifier column 304, which is a primary key. In response to this discovery, the DBMS 150 created the sparse table 245-4, comprising only the rows with "user 1" in the user identifier column 402, copied from the corresponding row in the table 245-1. Also in response to this discovery, the DBMS 150 read the columns in all other tables of the database 240-1 and discovered that the foreign key 306 in the mapping table 245-2 has an identical name to the worker identifier column 304 in the worker table 245-1. The DBMS 150 then searched for and discovered all of the rows in the foreign key 306 of "123" that matched the value of "123" in the primary key column 304 of the worker table 245-1, in the row that comprised "user 1." In response to this discovery, the DBMS 150 created the sparse mapping table 245-5, comprising only the rows with a worker identifier 306 of "123." Then DBMS 150 then repeated the above process with the primary key 308 values in the rows that comprise "123" in the worker identifier column 306. For example, the DBMS 150 searched all the tables and found a foreign key 312 in the client table 245-3 with an name identical to the name of the primary key 308 (both are "client ID") and found all the rows in the client table 245-3 that comprise values in the foreign key 312 that match the values in the primary key 308 in the sparse mapping table 245-5, and stored only those found rows in the sparse client table 245-6.

Figure 5:
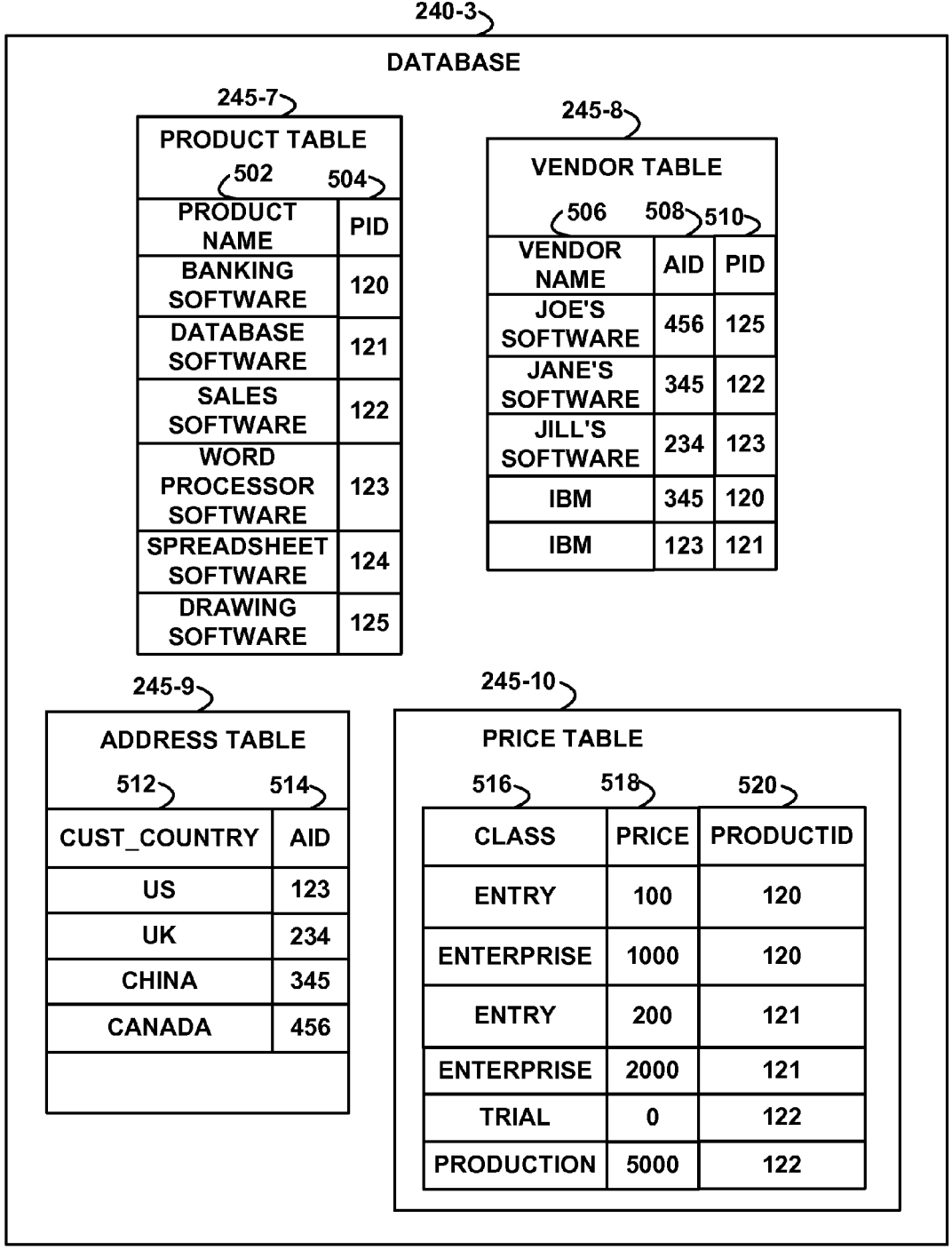
FIG. 5 depicts a block diagram of an example database, according to an embodiment of the invention.

FIG. 5 depicts a block diagram of an example database 240-3, according to an embodiment of the invention. The example database 240-3 comprises an example product table 245-7, vendor table 245-8, address table 245-9, and price table 245-10, each of which are examples of, and are generically referred to by, the tables 245 (FIG. 2). The example product table 245-7 comprises any number of rows, each of which comprises an example product name column 502 and a PID (product identifier) column 504. The example vendor table 245-8 comprises any number of rows, each of which comprises an example vendor name column 506, an address identifier (AID) column 508, and a product identifier column (PID) column 510. The example table 245-9 comprises any number of rows, each of which comprises an example cust_country column 512 and an address identifier (AID) column 514. The example price table 245-10 comprises any number of rows, each of which comprises an example class column 516, a price column 518, and a productID column 520.

Figure 6:
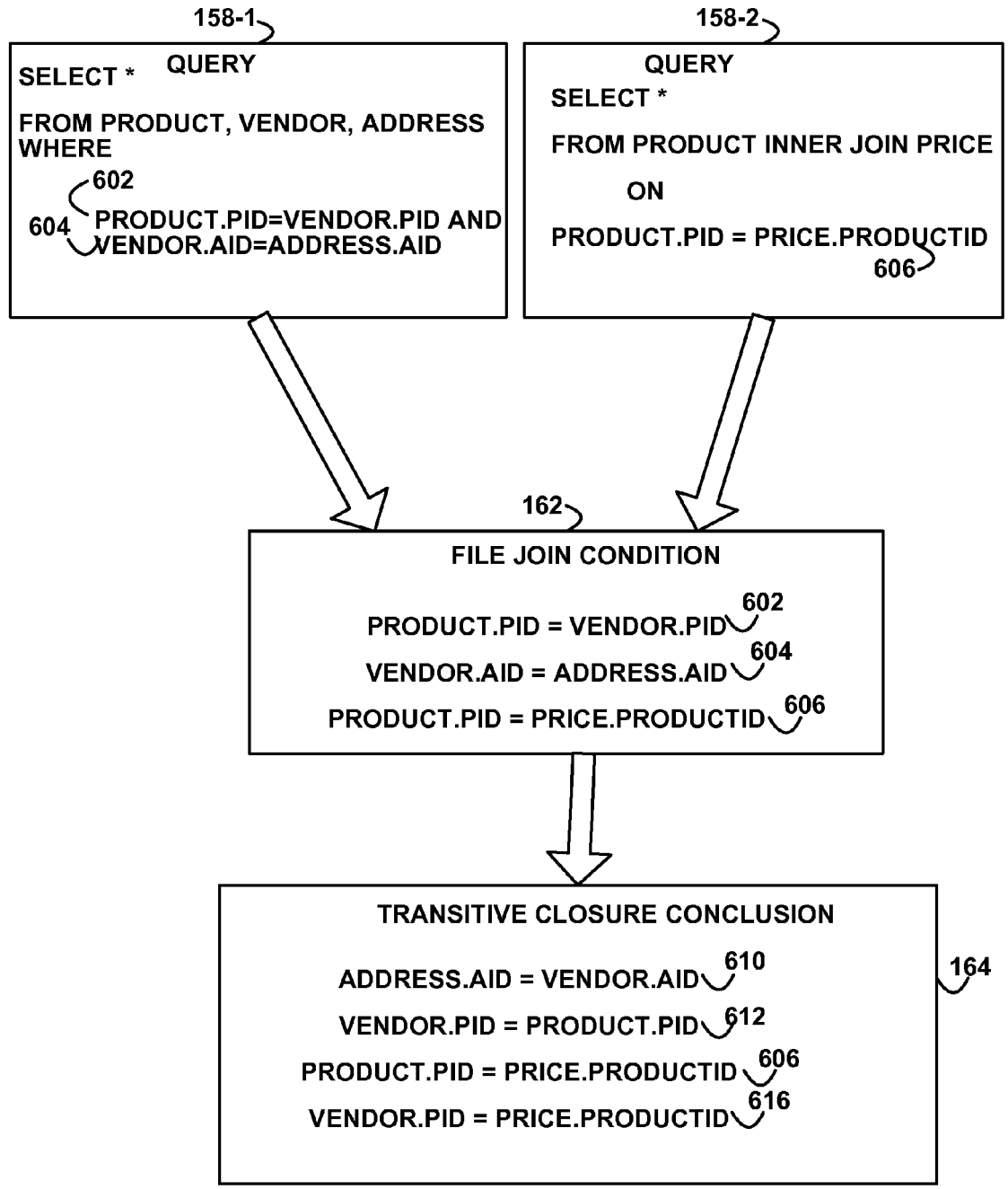
FIG. 6 depicts a block diagram of an example transitive closure conclusion, which is created from an example file join condition, which is created from example queries, according to an embodiment of the invention.

FIG. 6 depicts a block diagram of an example transitive closure conclusion 164, which is created from an example file join condition 162, which is created from example queries 158-1 and 158-2, according to an embodiment of the invention. The transitive closure conclusion 164 represents dependency relationships between columns of the database, which the DBMS 150 infers from join predicates of received queries 158 or from referential constraints (primary and foreign keys in the database). The queries 158-1 and 158-2 are examples of, and are generically referred to by, the query 158 (FIG. 1). The query 158-1 comprises join predicate statements 602 and 604, each of which specifies two columns of tables, the data values in rows of which must be equal, in order for execution of the query 158-1 to store the rows to the result set 152. The query 158-2 comprises a join predicate statement 606, which specifies two columns of tables, the data values in rows of which must be equal, in order for execution of the query 158-2 to store the rows to the result set 152. The file join condition 162 comprises the join predicate statements 602, 604, and 606, which the DBMS 150 read from the queries 158-1 and 158-2 and stored to the file join condition 162.

The DBMS 150 reads the join predicate statement 604 from the file join condition 162, swaps the column identifiers to create the statement 610, using the symmetric property of equality (where if A=B, then B=A, where A and B are real numbers, quantities, or data values), and stores the statement 610 to the transitive closure conclusion 164. The DBMS 150 reads the join predicate statement 602 from the file join condition 162, swaps the column identifiers to create the statement 612, using the symmetric property of equality, and stores the statement 612 to the transitive closure conclusion 164. The DBMS 150 reads the join predicate statement 606 from the file join condition 162 and stores the join predicate statement 606 to the transitive closure conclusion 164. The DBMS 150 infers the transitively inferred statement 616 from the statements 612 and 606, via the transitive property of equalities. The transitive property of equalities states that if A, B, and C are real numbers, quantities, or data values, then if A=B and B=C, then A=C. Thus, the two data values that are equal to the same data value are identical to each other. In an embodiment, the keys for which the transitive property is used have different identifiers or names e.g., the PID key and the productID key have different names, but are inferred to be equal by the transitively inferred statement 616. Thus, the transitive closure conclusion 164 comprises a path of linked statements created from join predicate statements. Although FIG. 6 illustrates join predicates as specifying an operator of equality (represented by the equals "=" sign), in other embodiments the operator may be any operator, as previously described above.

Figure 7:
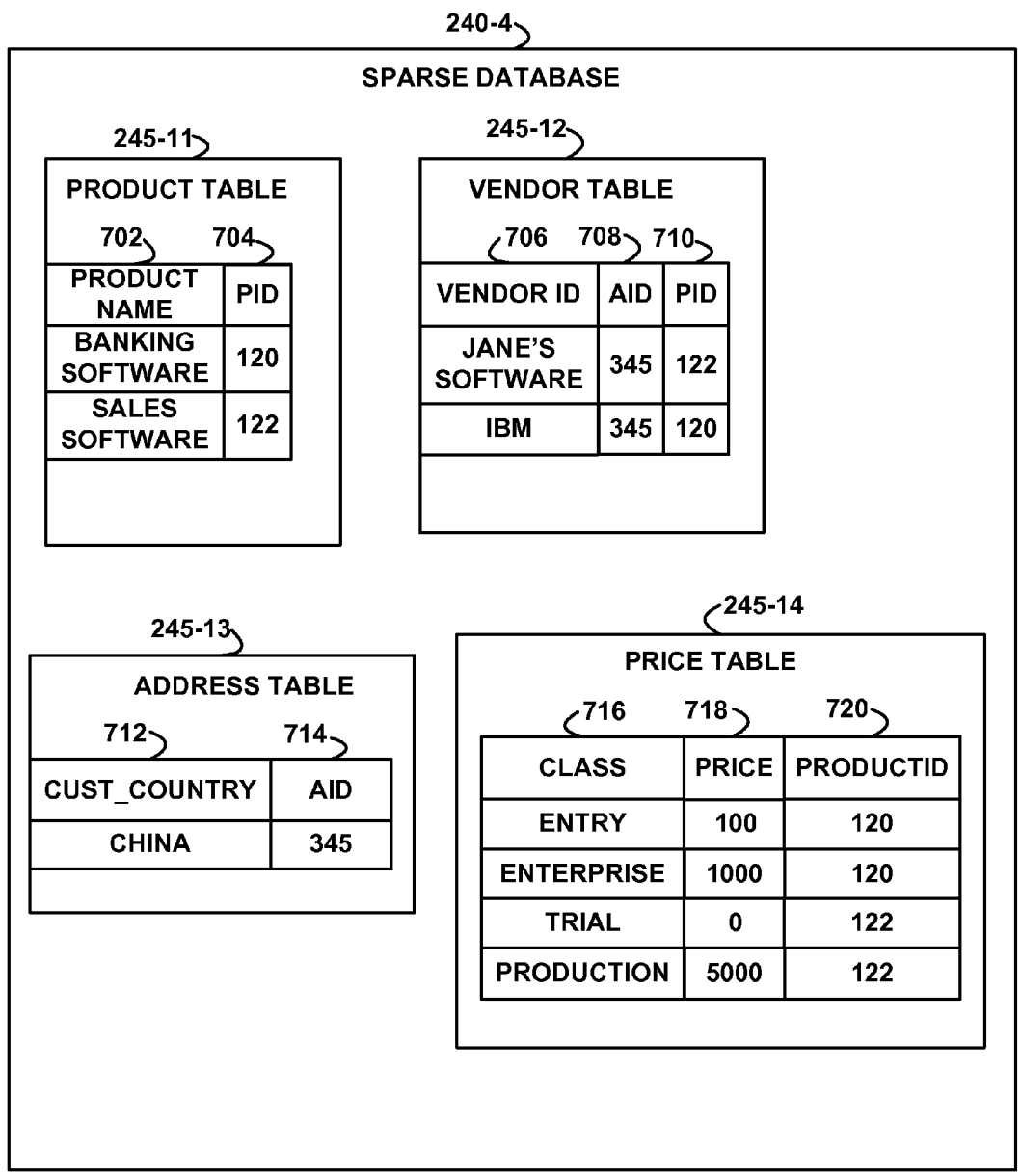
FIG. 7 depicts a block diagram of an example sparse database, according to an embodiment of the invention.

FIG. 7 depicts a block diagram of an example sparse database 240-4, according to an embodiment of the invention. The example sparse database 240-4 comprises an example product table 245-11, a vendor table 245-12, an address table 245-13, and a price table 245-14, each of which are examples of, and are generically referred to by, the tables 245 (FIG. 2). The example product table 245-11 comprises any number of rows, each of which comprises an example product name column 702 and a PID (product identifier) column 704. The example vendor table 245-12 comprises any number of rows, each of which comprises an example vendor ID column 706, an address identifier (AID) column 708, and a product identifier column (PID) column 710. The example address table 245-13 comprises any number of rows, each of which comprises an example cust_country column 712 and an address identifier (AID) column 714. The example price table 245-14 comprises any number of rows, each of which comprises an example class column 716, a price column 718, and a productID column 720.

The DBMS 150 created the sparse database 240-4 from the database 240-3 and the transitive closure conclusion 164 by iteratively or recursively reads the rows from the tables of the database 240-3, starting from the rows that comprise a specified value in a specified key, traversing the path of the transitive closure conclusion 164 and finding all rows in all tables in the schema of the database 240-3 for which the statements 610, 612, 606, and 616 in the transitive closure conclusion 164 are true and storing only those found rows (and not rows for which the statements 610, 612, 606, and 612 are false) to the sparse database 240-3. The DBMS 150 may then perform a requested function on only the found rows (in the sparse database 240-3) for which the join predicate statements in the transitive closure conclusion 164 are true and not on rows for which the join predicate statements in the transitive closure conclusion 164 are false.

In the example of FIG. 7, the DBMS 150 received a request to create a sparse database and a specified key of "cust_country" and a specified key value of "china." In response to the request, the DBMS 150 found all rows in the address table 245-9 for which cust_country 512 equals "china," read the values from AID 514 of "345" from those found rows and stored those rows to the sparse address table 245-13 of the sparse database 240-4. The DBMS 150 then reads the statement 610 from the transitive closure conclusion 164 and, in response, found all of the rows in the vendor table 245-8 for which the address.AID 714 of "345" (in the sparse address table 245-13) equals the vendor.AID 508 and stored those found rows to the sparse vendor table 245-12 in the sparse database 240-4. The DBMS 150 then reads the statement 612 from the transitive closure conclusion 164 and, in response, found all of the rows in the product table 245-7 for which the data values in the vendor.PID 710 of "122" or "120" equals the data values in the product.PID 504 (in the product table 245-7) and stored those found rows to the sparse product table 245-11 in the sparse database 240-4. The DBMS 150 then reads the join predicate statement 606 from the transitive closure conclusion 164 and, in response, found all of the rows in the price table 245-10 for which the data values in the rows of the product.PID 704 (in the sparse product table 245-11) of "120" or "122" equal the data values in the rows of the price.productID 520 of the table 245-10 and stored those found rows to the sparse price table 245-14 in the sparse database 240-4. The DBMS 150 then reads the statement 616 from the transitive closure conclusion 164 and, in response, found all of the rows in the price table 245-10 for which the data values in the rows of the vendor.PID 710 equal the data values in the rows of the price.productID 520 of the price table 245-10 and stored those found rows to the sparse price table 245-14.

Figure 8:
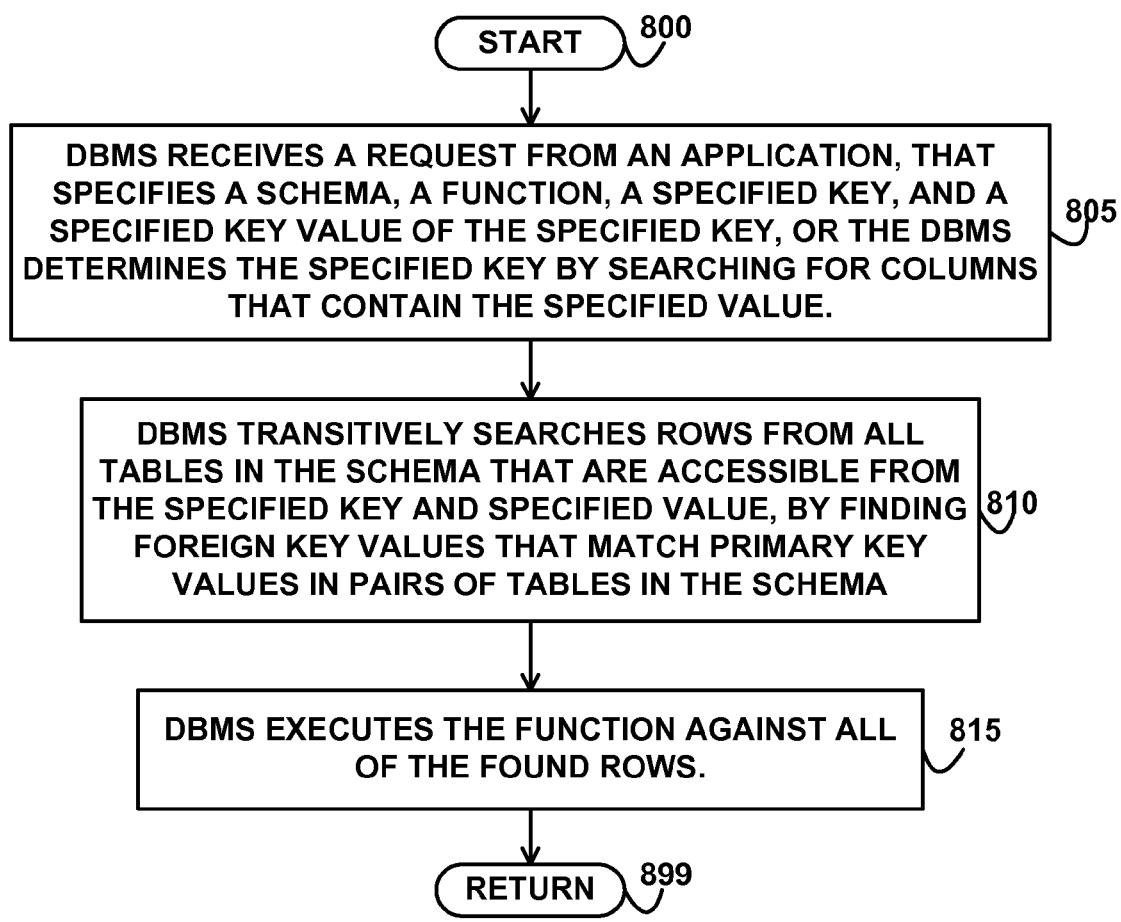
FIG. 8 depicts a flowchart of example processing for executing a function against joined rows of database, according to an embodiment of the invention.

FIG. 8 depicts a flowchart of example processing for executing a function against joined rows of database, according to an embodiment of the invention. Control begins at block 800. Control then continues to block 805 where the DBMS 150 receives a request from the application 160, which specifies a schema that comprises databases or database tables, a function, a specified key, and a specified value of the specified key. In another embodiment, the application 160 does not specify the specified key. Instead, the DBMS 150 determines the key by searching all rows in all columns in all tables in the schema for data values that match the specified value. The DBMS 150 then sets the specified key to be the column or columns that contain data values that match the specified value.

Control then continues to block 810 where the DBMS 150 transitively searches rows from all tables in the schema that are accessible from the specified key and specified key value, by finding foreign key values that match primary key values (wherein the foreign keys and primary keys have names or identifiers identical to the specified key) in rows in pairs of the tables 245 in the schema or in pairs of columns in a table or tables, starting from the specified key value. In an embodiment, the keys may be in the same table 245. Control then continues to block 815 where the DBMS 150 executes the function against all of the found rows (using data values read from the found rows) and only the found rows.

In various embodiments, executing the functions may enable row level access control of only the found rows, provide read, update, or delete access to the application 160 or a specified user or group of users to only the found rows, encrypt only the found rows, grant or alter authority for the application 160, a specified user, or a specified group of users to the tables that contain the found rows, grant or alter authority to indexes that access the found rows, or create a sparse database whose database rows comprise data values from the found rows (and not from rows that were not found, i.e., that are not reachable or accessible from rows that comprise data that match the specified key and key value).

Control then continues to block 899 where the logic of FIG. 8 returns.

Figure 9:
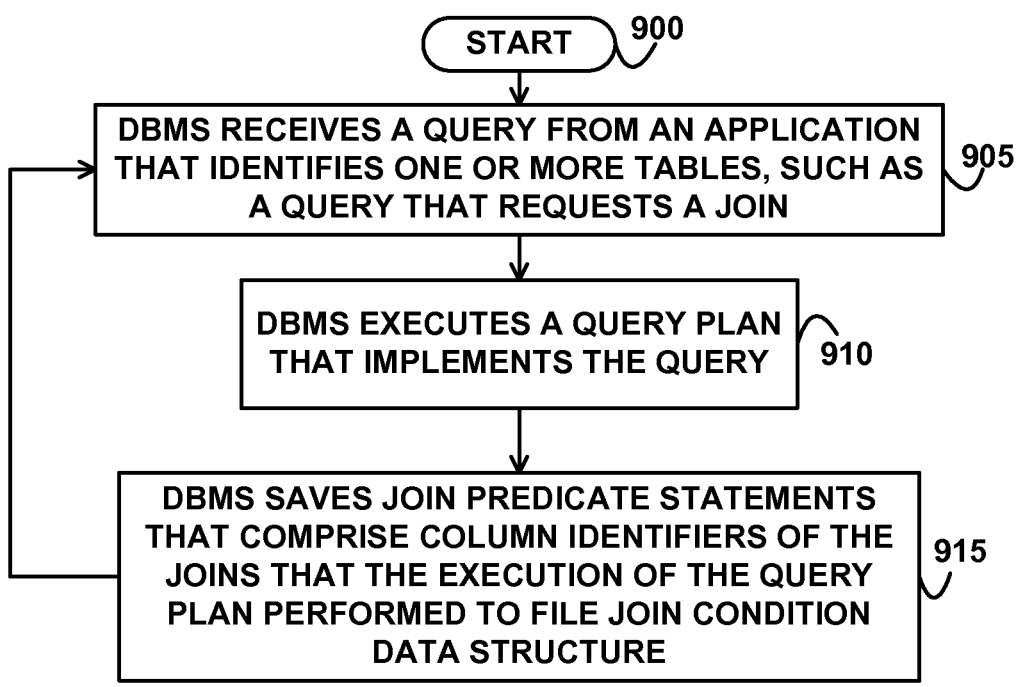
FIG. 9 depicts a flowchart of example processing for creating a file join condition, according to an embodiment of the invention.

FIG. 9 depicts a flowchart of example processing for creating a file join condition 162, according to an embodiment of the invention. Control begins at block 900. Control then continues to block 905 where the DBMS 150 receives a query 158 from an application 160 that identifies one or more tables 245, such as a query that requests a join. Control then continues to block 910 where the DBMS 150 executes a query plan that implements the query, storing found rows that satisfy the query to the result set 152. Control then continues to block 915 where the DBMS 150 stores the join predicate statements from the query 158 that comprise column identifiers of the joins that the execution of the query plan performed into the file join condition 162. Control then returns to block 905 where the DBMS 150 receives the same or a different query from the same or a different application that identifies the same or different tables, as previously described above.

Figure 10:
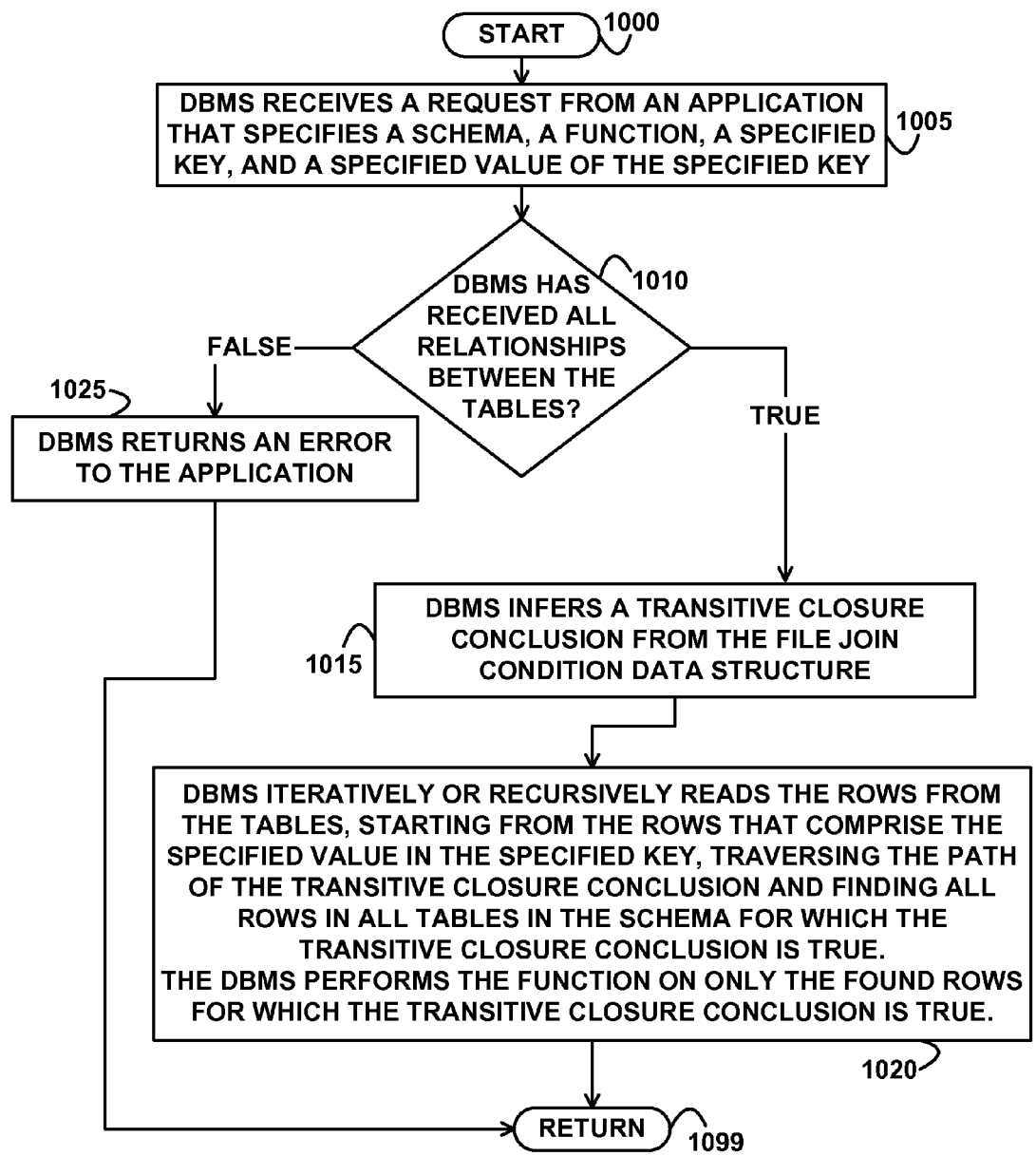
FIG. 10 depicts a flowchart of example processing for executing a function against joined rows of database using a transitive closure conclusion, according to an embodiment of the invention.

FIG. 10 depicts a flowchart of example processing for executing a function against joined rows of database using a transitive closure conclusion, according to an embodiment of the invention. Control begins at block 1000. Control then continues to block 1005 where the DBMS 150 receives a request from an application 160 that specifies a schema, a function, a specified key, and a specified key value of the key.

Control then continues to block 1010 where the DBMS 150 determines whether the DBMS 150 has received all relationships between all of the tables in the schema. In an embodiment, the DBMS 150 makes the determination of block 1010 by determining whether the DBMS 150 has received a command from the application 160 or from an administrator or user via the user I/O device 121, indicating that the DBMS 150 has received all of the relationships between the tables. If the DBMS 150 has received such a command, then the determination at block 1010 is true. If the DBMS 150 has not received such a command, then the determination at block 1010 is false. In an embodiment, the DBMS 150 makes the determination at block 1010 by determining whether the percentage of incoming unique queries to the DBMS 150 is less than a threshold percentage. The DBMS 150 may calculate the percentage of incoming unique queries as the number of unique queries that the DBMS 150 received within a most recent time period divided by the total number of unique queries. The DBMS 150 may receive the threshold percentage and the time period from the application 160 or from an administrator or user via the user I/O device 121. In an embodiment, the DBMS 150 makes the determination at block 1010 by determining whether the most recent time that the DBMS 150 received a query that comprises a new join predicate (different from all previously received join predicates) is more than a threshold amount of time ago. If the most recent time that the DBMS 150 received a query that comprises a new join predicate (different from all previously received join predicates) is more than the threshold amount of time ago, then the determination at block 1010 is true. If the most recent time that the DBMS 150 received a query that comprises a new join predicate (different from all previously received join predicates) is less than or equal to the threshold amount of time ago, then the determination at block 1010 is false.

If the determination at block 1010 is true, then the DBMS 150 has received all of the relationships between all of the tables 245 in the schema, so control continues to block 1015 where the DBMS 150 infers a transitive closure conclusion 164 from the file join condition 162, as previously described above with reference to FIG. 6. In another embodiment, the DBMS 150 infers the transitive closure conclusion 164 and the dependency relationship it represents between the referential constraints of pairs of columns.

Control then continues to block 1020 where the DBMS 150 iteratively or recursively reads the rows from the tables, starting from the rows that comprise the specified value in the specified key, traversing the path of the linked join predicate statements in the transitive closure conclusion 164 (reading the rows from the all the tables specified by the transitive closure conclusion 164) and finding all rows in all tables in the schema for which the transitive closure conclusion 164 is true. Thus, the DBMS 150 transitively searches rows from all tables that are accessible from the specified key value, wherein the transitively searching further comprises finding values in a plurality of pairs of columns wherein found rows that are found by the transitively searching comprise values in a respective first column of the plurality of pairs of columns that satisfy a dependency relationship with values in a respective second column of the plurality of pairs of columns. The DBMS 150 performs the function on only (e.g., reads only) the found rows for which the join predicate statements in the transitive closure conclusion 164 are true, but does not perform the function on (e.g., does not read) rows for which the join predicate statements in the transitive closure conclusion 164 are false (for which the dependency relationship is not satisfied). Control then continues to block 1099 where the logic of FIG. 10 returns.

If the determination at block 1010 is false, then the DBMS 150 has not received all of the relationships between all of the tables 245 in the schema, so control continues to block 1025 where the DBMS 150 returns an error to the application 160. Control then continues to block 1099 where the logic of FIG. 10 returns.

In this way, in an embodiment, the DBMS 150 discovers relationships between data in databases and applies functions to them, which frees the user from manually searching for relationships.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A non-transitory computer-readable storage medium encoded with instructions, wherein the instructions when executed comprise:

receiving a request that specifies a function to be performed in a database having a plurality of tables and at least one specified key value for a specified key column;

transitively searching rows from all tables of said database that are accessible from the specified key value, wherein the transitively searching further comprises finding values in a plurality of pairs of key columns by iteratively:

(a) finding one or more rows in a current table, each found row containing a key value in a key column from a set of key values for the key column, (b) determining at least one respective pair of key columns, each respective pair of key columns comprising a respective first key column in the current table and a respective second key column in a next table, wherein values in the respective first key column of the plurality of pairs of key columns in the current table satisfy a dependency relationship with values in the respective second key column of the plurality of pairs of key columns in the next table, wherein at least one key column in the respective pair of key columns is not specified by said request, (c) determining a set of key values for the respective second key column, the set of key values containing each value in the respective first key column of each found row in the current table, and (d) repeating (a)-(c) for the next table; and executing the function against only the found rows.

2. The non-transitory computer-readable storage medium of claim 1, wherein the respective first key column comprises a respective primary key and the respective second key column comprises a respective foreign key.

3. The non-transitory computer-readable storage medium of claim 1, further comprising:

inferring the dependency relationship between the plurality of pairs of key columns from join predicates of received queries.

4. The non-transitory computer-readable storage medium of claim 1, further comprising:

inferring a dependency relationship between the plurality of pairs of key columns from referential constraints of the plurality of pairs of key columns.

5. The non-transitory computer-readable storage medium of claim 1, wherein the executing the function against only the found rows comprises performing the function that is selected from a group consisting of: creating a database that comprises data values that comprise only the found rows, enabling row level access control of only the found rows, encrypting only the found rows, granting authority to only the found rows, and altering the authority to only the found rows.

6. The non-transitory computer-readable storage medium of claim 1, wherein the transitively searching further comprises:

finding the values in a plurality of pairs of key columns, wherein found rows that are found by the transitively searching comprise values in a respective first key column of the plurality of pairs of key columns that match values in a respective second key column of the plurality of pairs of key columns.

7. The non-transitory computer-readable storage medium of claim 1, further comprising:

determining the plurality of pairs of key columns by searching for the plurality of pairs of key columns that comprise rows that comprise the specified key value.

8. The non-transitory computer-readable storage medium of claim 1, wherein the executing the function against only the found rows comprises granting authority to indexes that access the found rows.

9. A computer comprising:

a processor; and memory communicatively connected to the processor, wherein the memory is encoded with instructions, and wherein the instructions when executed by the processor comprise receiving a request that specifies a function to be performed in a database having a plurality of tables and at least one specified key value for a specified key column;

determining a plurality of pairs of columns by searching for the plurality of pairs of columns that comprise rows that comprise the specified key value, transitively searching rows from all tables of said database that are accessible from the specified key value, wherein the transitively searching further comprises finding values in a plurality of pairs of key columns by iteratively:

(a) finding one or more rows in a current table, each found row containing a key value in a key column from a set of key values for the key column, (b) determining at least one respective pair of key columns, each respective pair of key columns comprising a respective first key column in the current table and a respective second key column in a next table, wherein values in the respective first key column of the plurality of pairs of key columns in the current table satisfy a dependency relationship with values in the respective second key column of the plurality of pairs of key columns in the next table, wherein at least one key column in the respective pair of key columns is not specified by said request, (c) determining a set of key values for the respective second key column, the set of key values containing each value in the respective first key column of each found row in the current table, and (d) repeating (a)-(c) for the next table; and executing the function against only the found rows.

10. The computer of claim 9, wherein the respective first key column comprises a respective primary key and the respective second key column comprises a respective foreign key.

11. The computer of claim 9, wherein the instructions further comprise:

inferring the dependency relationship between the plurality of pairs of key columns from join predicates of received queries.

12. The computer of claim 9, wherein the instructions further comprise:

inferring a dependency relationship between the plurality of pairs of key columns from referential constraints of the plurality of pairs of key columns.

13. The computer of claim 9, wherein the executing the function against only the found rows comprises performing the function that is selected from a group consisting of: creating a database that comprises data values that comprise only the found rows, enabling row level access control of only the found rows, encrypting only the found rows, granting authority to only the found rows, and altering the authority to only the found rows.

14. The computer of claim 9, wherein the transitively searching further comprises:

finding the values in a plurality of pairs of key columns, wherein found rows that are found by the transitively searching comprise values in a respective first key column of the plurality of pairs of key columns that match values in a respective second key column of the plurality of pairs of key columns.

15. The computer of claim 9, wherein the executing the function against only the found rows comprises granting authority to indexes that access the found rows.

* * * * *